Feb. 17, 1953 C. W. DANN ET AL 2,628,841

ADVANCE MARKER FOR DICTATING MACHINES

Original Filed March 12, 1948 2 SHEETS—SHEET 1

Inventors
Charles W. Dann
Richard M. Somers

By Henry Lanahan
Attorney

ADVANCE MARKER FOR DICTATING MACHINES

Original Filed March 12, 1948 2 SHEETS—SHEET 2

Inventors
Charles W. Dann
Richard M. Somers

By Henry Lanahan
Attorney

Patented Feb. 17, 1953 2,628,841

UNITED STATES PATENT OFFICE 2,628,841

ADVANCE MARKER FOR DICTATING MACHINES

Charles W. Dann, Malden, Mass., and Richard M. Somers, West Orange, N. J., assignors to Thomas A. Edison, Incorporated, West Orange, N. J., a corporation of New Jersey Original application March 12, 1948, Serial No. 14,506. Divided and this application April 20, 1950, Serial No. 157,146

3 Claims. (Cl. 274—1)

This application is a division of our application Serial No. 14,506 filed March 12, 1948 (now Patent No. 2,533,359 dated December 12, 1950).

This invention relates to machines for recording and reproducing dictation. Although the invention is especially useful with machines of the disk-record type, no unnecessary restriction thereto is intended.

During the course of recording dictation, the operator often finds need to listen back to portions of previously-recorded matter in order to reconstruct in his mind the run of his thoughts. In dictating machines of the usual type, the recorder and reproducer are moved in unison relative to the rotating record, with one or the other being in operative engagement with the record depending upon whether recording or reproducing is desired. A movably mounted carriage is provided, and is movable manually to backspace the reproducer to the desired point on the record. If after such backspacing the operator should not listen to the end of the recordation on the record, he will have to advance the carriage manually to place the recorder a slight distance beyond its last prior position of farthest advance, before again resuming recording, in order to assure that the recorder stylus will not engage a recorded area of the record and cause obliteration of matter already recorded. It is very useful in this respect to provide the operator with some indication of the last prior position of farthest advance of the recorder, other than that to be gained visually by observing the relative positioning of the recorder stylus to the grooves on the record, in order to facilitate the correct positioning of the recorder and also to permit a substantially full enclosure of the phonographic mechanism and record. The advantages of such full enclosure are several: not only does it protect the mechanism from dust and dirt, but it also enables the record to be kept free from dust to permit reproduction of the recorded matter with a minimum of record surface noise. The protection of the record is particularly important as to records of thermoplastic material since these materials, while inherently noiseless, do tend readily to pick up dust particles from the air by electrostatic attraction.

An object of this invention is to provide a novel and improved mechanism, which is operated automatically in the normal use of the dictating machine, to define the position of farthest advance reached by the recorder prior to a backspacing thereof.

Another object is to provide an improved defining mechanism which forms a position-indicating mark on the indexing card or slip of the dictating machine whenever the record-reproduce lever is shifted out of "record" position.

Another object is to provide a novel indicator in operative association with the defining mechanism, which indicator is adapted to cause the operator to position the recorder in advance of the recordation by a suitable clearance margin.

These and other objects and features of the invention will be apparent from the following description and the appended claims.

In the description of our invention reference is had to the accompanying drawings, of which:

Figure 1:
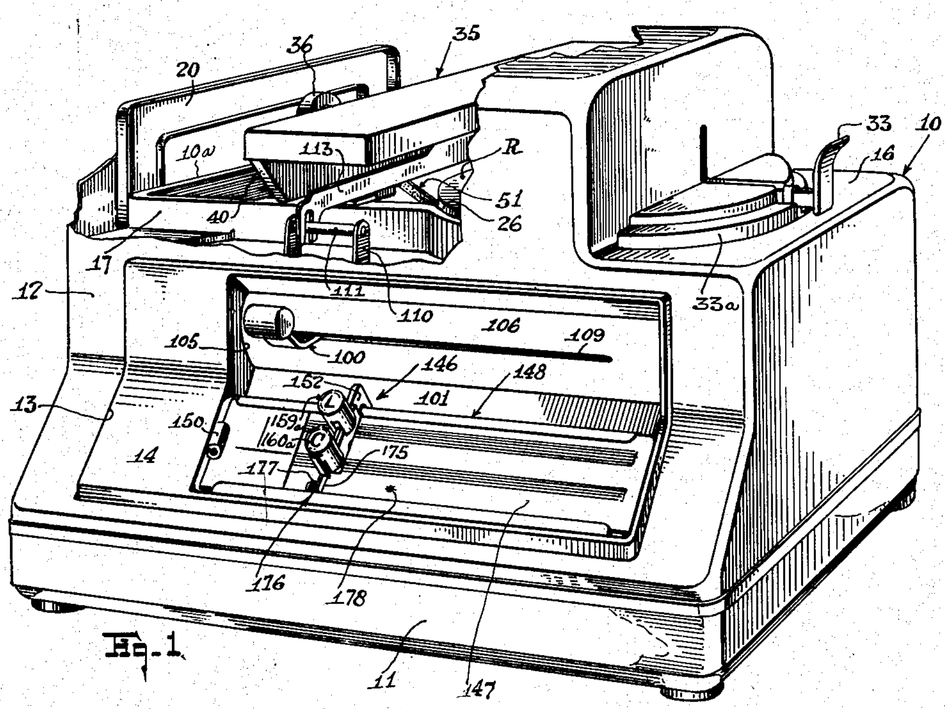
Figure 1 is a perspective view, with parts broken away, of a dictating machine incorporating our invention.
Figures 3, 4, 5, 6, 7:
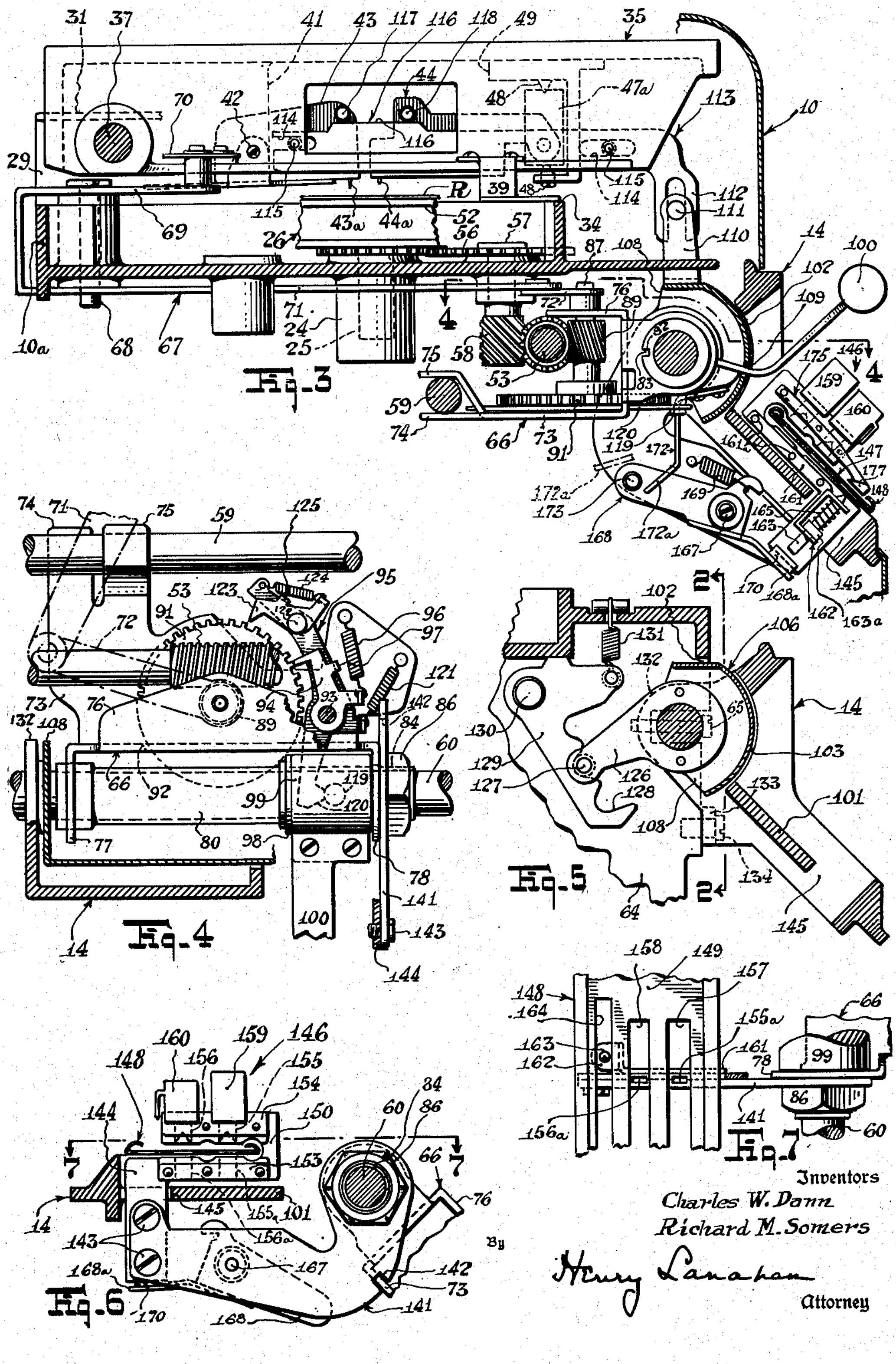
Figure 3 is a fractional vertical section taken substantially on the line 3—3 of Figure 2.
Figure 4 is a fractional horizontal section taken substantially on the line 4—4 of Figure 3.
Figure 5 is a fractional vertical section taken substantially on the line 5—5 of Figure 2.
Figure 6 is a fractional vertical section taken substantially on the line 6—6 of Figure 2.
Figure 7 is a partial view of the apparatus of Figure 6 as seen from the line 7—7 of that figure.

In the accompanying figures there is shown a preferred embodiment of a dictating machine incorporating our invention. This machine has a housing 10 provided with a rectangular base 11. The housing has a front wall 12 which slopes downwardly and forwardly and in which there is a large opening 13 to expose a transverse section 14 of the frame of the machine (Figures 1 and 3). The housing has a portion of reduced height at its right end which forms a horizontal platform 16 to permit access to the record as will appear.

Figure 2:
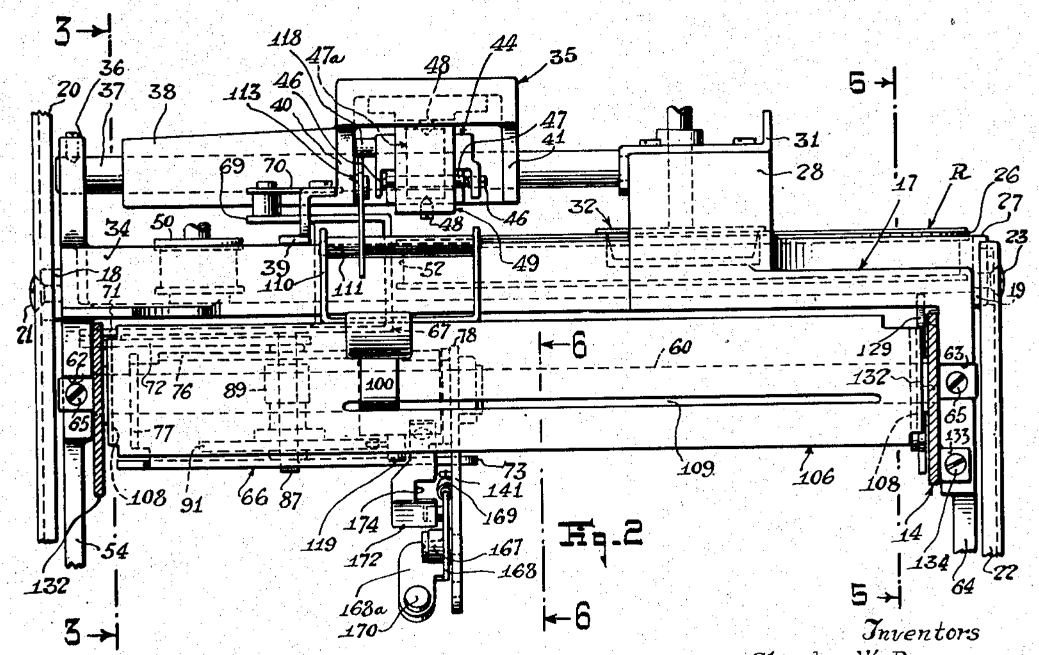
Figure 2 is a fractional front elevational view of this machine with parts of the frame in section on the line 2—2 of Figure 5.

The frame of the machine comprises a horizontal top plate 17 having pairs 18 and 19 of laterally-projecting bosses at its left and right sides respectively (Figure 2). The left pair of bosses is secured to an upstanding channeled frame member 20 by screws 21, and the right pair of bosses is secured to another upstanding journalled frame member 22 by screws 23. These channeled frame members stand on the base of the housing and rise to the height of the left and right sides of the machine (Figures 1 and 2).

The top plate 17 has a bearing 24 in the central right-hand portion (Figure 3) in which there is journalled a depending shaft 25 of a turntable 26. Surrounding the right half portion of this turntable is an arcuate flange 27 standing to a level just short of the top face of the turntable. At the front and back of the turntable are standards 28 and 29 on the top plate 17 (Figures 2 and 3). Mounted on these standards is a channeled frame member 31 (Figures 2 and 3) which overlies the turntable and which carries a record-clamping mechanism 32 fractionally indicated in Figure 2. Since this clamping mechanism forms no part of the present invention and is described in full in the pending sole application of Charles W. Dann, one of the joint applicants of the present application, Serial No. 780,036, filed October 15, 1947, and entitled "Phonograph," it is not necessary to be herein described other than that it has a handle 33 shown in Figure 1.

The righthand portion of the turntable overlies the platform 16 and is normally covered by a shallow arcuate cover 33*a* which is hinged to the housing and which is opened by the handle 33 whenever the record-clamping mechanism is released. This part of the machine need not be herein described since the same is the subject of a pending sole application of Richard M. Somers, one of the joint applicants of the present application, Serial No. 773,129, filed September 10, 1947, and entitled "Closure for Phonograph."

The arcuate flange 27 extends around a portion of the turntable to the left of the front standard 28, and then extends rectilinearly to the left side of the top plate to form a guide rail 34 for slidably supporting the forward end of a carriage 35. A further extension 10*a* of this rail along the left and rearward sides of the top plate constitutes a reenforcing flange. Supported between the standard 36 at the left rearward corner of the top plate and the channeled frame member 31 is a transverse rod 37 on which the carriage 35 is slidably mounted, the carriage having a long bearing 38 embracing this rod as shown in Figure 2. At the forward end of the carriage there is a depending foot 39 (Figures 2 and 3) which rests slidably on the guide rail 34. This mounting permits traveling movement of the carriage across the left half portion of the turntable.

The carriage 35 may be a casting having a top wall with a left side wall 40 along its full length and with a right side wall 41 along only its rearward portion. In these side walls there are pivots 42 for pivotally supporting a recorder 43 having a recording stylus 43*a* at its forward end. Mounted at the front of the recorder on this carriage is a reproducer 44 having a reproducing stylus 44*a* at its rearward end. This reproducer has a pair of cone pivots 46 at its forward end which engage a transverse rod 47 (Figure 2) carried by a vertical cylinder 47*a*. This cylinder is pivoted on two cone pivots 48 carried by a U-shaped standard 49 mounted on the carriage 35. The reproducer is thus mounted universally for both vertical and transverse movement of its stylus relative to a mounted record R on the turntable.

The drive mechanism for the turntable and the carriage 35 comprises a motor (not shown) having a drive pulley 50 coupled directly to the turntable by a belt (not shown) which rides in a peripheral groove 52 of the turntable. Supported by the top plate is a laterally-extending feed screw 53, fractionally shown in Figures 3 and 4, which is coupled by a spiral gearing 58 to a vertical shaft 57 that is journalled in the top plate.

This vertical shaft is in turn coupled to the shaft 25 of the turntable by a gear train 58. Accordingly the feed screw is turned whenever the turntable is in rotation. At the back side of the feed screw and in parallel relation thereto is a stationary support rod 59, and at the front side of the feed screw there is a similar support rod 60 having end portions with diametrically opposite flats 61 of which the left end portion seats in a rectangular recess 62 provided in a depending standard 54 of the top plate and the right end portion seats in a rectangular recess 63 provided in a depending standard 64 of the top plate as shown in Figures 2 and 5. (The transverse frame member 14 has rearwardly-extending apertured lugs 132 engaging the rod 60, and has a lug 133 at its right end secured by a screw 134 to the depending standard 64 as shown in Figures 2, 4 and 5.) These end portions are held in place to the standards by screws 65. These rods 59 and 60 have slidably mounted thereon a carriage 66 which is moved along the support rods by the feed screw 53 as is hereinafter described. This carriage 66 serves particularly as a traveling support for a record-reproduce lever 100 of the machine and for a certain indexing apparatus as will appear.

The carriage 35 is coupled to the carriage 66 by a mechanism comprising a lever 67 which embraces the top plate 17 and which is pivoted thereto at 68. This lever 67 has a short horizontal arm 69 above the top plate coupled by a link 70 to the carriage 35 and has a relatively long horizontal arm 71 below the top plate coupled by a link 72 to the carriage 66, the links being pivoted at their ends to the respective arms and carriages. These links have lengths proportional respectively to the distance of their pivots on the lever 67 from the pivot axis 68 of the lever, and are so mounted as to lie parallel to each other in all positions of the carriages, so that the carriage 35 will be driven in absolute correspondence with the traveling movement of the carriage 66 but at a less rate and through a smaller range.

The carriage 66 comprises a horizontal plate 73 having two rearwardly-extending fingers 74 and 75 displaced vertically from each other to form a fork which slidably embraces the rod 59. At the front the plate 73 is bent upwardly and then rearwardly to provide an overhanging top flange 76. Extending forwardly from the carriage are apertured lugs 77 and 78 which receive a sleeve 80 that is slidably mounted on the cross rod 60. This sleeve has a collar 81 at its left end notched at 82. The left lug 77 of the carriage embraces this collar and has an inwardly-projecting key 83 which engages this notch to lock the sleeve against turning relative to the carriage. The right lug 78 embraces a reduced-diameter portion 84 of the sleeve and is clamped thereto by a nut 86. Thus the carriage is secured firmly to the sleeve 80 and is mounted for free back and forth traveling movement along the support rods 59 and 60.

Mounted in the bottom plate 73 and top flange 76 of the carriage 66 is a vertical pin 87 to the upper end of which the link 72 is pivoted. Journalled on this pin 87 is a circular feed nut 89 which engages continuously the feed screw 53. Staked to the lower end of this feed nut is a gear 91 the forward portion of which projects through a slot 92 in the front wall of the carriage 66 (Figure 4). Mounted on the plate 73 to the right of this gear is a stud 93 on which there is pivoted a latching pawl 94.

Also pivoted on this stud is a rock lever 95 for operating this pawl. The pawl is urged towards the gear 91 by a tension spring 96 but has a stop lug 97 which engages the back side of the rock lever 95 to prevent engagement of the pawl with the gear 91 unless the rock lever is in a released position. When the latching pawl is in engagement with the gear 91 the feed nut 89 is locked to the carriage 66 and the carriage is driven along the rods 59 and 60 whenever the turntable is rotated.

The sleeve 80 has a collar 98 intermediate its ends to provide a localized bearing for a hub 99 of the record-reproduce lever hereinbefore referred to. This control lever projects forwardly through the opening 13 in the housing 10 and constitutes a means (1) for manually moving the carriage 66 to position the recorder and reproducer in relation to a mounted record, (2) for controlling the recorder and reproducer in relation to a mounted record, (3) for controlling the locking of the feed nut 89, (4) for operating a mechanism to effect a predetermined advance of the recorder and reproducer across the record when either is shifted from neutral to effective condition, and (5) for operating an advance marking mechanism. Of these several functions, the last will be herein later described in detail since it constitutes the essence of the present invention.

The frame member 14 has an inset wall 101 along its lower portion, and above which there is an opening 102 to the front of the rod 60. At the right and left ends of this opening there are inwardly-extending walls bounded respectively by edges 103 and 105 which are arcuate about the rod 60. The opening 102 is closed by an arcuate closure 106 conforming to the edges 103 and 105. This closure has rearwardly-extending apertured ears 108 at its ends which pivot on the rod 60. In this closure lengthwise thereof there is a clearance slot 109. The hand lever 100 extends through this slot to form a spline connection with the closure 106.

Secured as by welding to a top portion of the closure 106 is an upstanding U-member 110 bridged by a transverse rod 111. This rod is embraced slidably by a depending bifurcated arm 112 of a slide 113, the slide being mounted on the left wall 40 of the carriage 35 for front and back movement by means of screws 115 that thread into the left wall of the carriage and pass slidably through slots 114 in the slide. The bifurcated arm 112 slides on the rod 111 as the carriage 35 is moved, to maintain continuously a coupling of the record-reproduce lever with the slide in all positions of the carriage. On the slide 113 is an upwardly-extending cam 116 provided with a central dwell 116*a*. Extending leftwardly from the free end portions of the recorder 43 and reproducer 44 are respective lift fingers 117 and 118 which overlie this cam. When the hand lever 100 is in a central or neutral position—the position it occupies in Figure 3—both lift fingers rest on the dwell 116*a* to hold the recorder and reproducer out of contact with the record. As the hand lever 100 is moved downwardly into a record position, the slide 113 is moved forwardly to move the cam 116 ahead of the finger 117 and to allow the recorder stylus to engage the record under the influence of a suitable downward biasing thereof, but the other finger remains on the dwell 116*a* to continue to hold the reproducer stylus in a raised position above the record. As the hand lever is moved upwardly into a reproduce position, the cam 116 is first moved under the finger 117 to raise the recorder from the record and is then moved to the rear of the finger 118 to allow the reproducer to engage the record under the influence of its downward biasing.

Depending from the hub 99 of the hand lever 100 is a pin 119 for controlling the rock lever 95. When the control lever is in its neutral position this pin engages a cam 120 on the forward end portion of the rock lever to hold the rock lever in a clockwise position against the biasing force of a tension spring 121, in which position the latching pawl 94 is maintained out of engagement with the gear 91. Thus, when the hand lever 100 is in its neutral position, the feed nut 89 is unlocked to permit the carriages 66 and 35 to be moved manually. However, when the hand lever 100 is in either recording or reproducing position, the pin 119 is free of the cam 120 and the latching pawl 94 is under the influence of its biasing spring to engage the gear 91 and lock the feed nut. Thus, in these effective positions of the hand lever, the carriage 66 is coupled to the feed screw to cause the recorder and reproducer to be moved progressively across the record R as the turntable is rotated. Pivoted to the rear end portion of the rock lever 95 is a pawl 123. This pawl is urged counterclockwise, as it appears in Figure 4, by a tension spring 124 to a position defined by the engagement of a stop lug 125 of the pawl against the rock lever. Since this pawl 123 is farther removed from the pivot center 93 than is the tooth of the latching pawl 94, it has a greater range of movement and will engage the gear 91 sooner when the rock lever is released and will be disengaged sooner from the gear 91 when the rock lever is actuated than will the latching pawl 94. Moreover, since the tooth of the pawl 123 is offset considerably to the left of a line drawn from its pivot axis 122 to the pivot axis 93 and is positioned ahead of the pivot axis 122 as with respect to the axis 93, the initial movement of the rock lever after the pawl engages the gear 91 is effective to produce a definite counterclockwise movement of the gear before the latching pawl engages this gear. The amount of this movement will vary depending upon whether the pawl 123 will first engage a tooth or a space between two successive teeth of the gear 91, but in any case the gear will be turned more or less in relation to the latching pawl so that this pawl will engage a space between two successive teeth of the gear and will positively lock the feed nut. This counterclockwise turning of the gear 91, which occurs incidental to placing the recorder or reproducer into effective condition, effects an advance of the recorder and reproducer across the record. This advance is produced so that if an operator turns the hand lever 100 to neutral position and then restores it to recording position, the recording stylus will be at a clearance distance ahead of the recordation on the record to prevent superposing of one recordation on another with consequent obliteration of the recorded matter.

The carriage drive means abovedescribed, comprising the feed screw, engaging circular feed nut, latching pawl for the feed nut and means for operating the latching pawl, is not claimed herein but is claimed in our application Serial No. 14,506 of which this application is a division.

A detent is provided on the right end of the closure 106 to define the neutral, recording and reproducing positions of the hand lever 100. This detent comprises a rearwardly-extending arm 126 riveted to the right end 108 of the closure 106 and carrying a roler 127 at its rearward end. This roller engages a serrated edge 128 provided on a lever 129 that is pivoted at 130 to the standard 94 aforementioned, the lever 129 being urged constantly against the roller by a tension spring 131. The serrated edge 128 has three notches defining the respective positions of the hand lever abovementioned.

Clamped between the lug 78 and nut 86 is a forwardly-extending arm 141 which has a notch 142 engaged by a portion of the bottom plate 73 of the carriage 66 to hold the arm in fixed relation to this carriage. Secured by screws 143 to the forward end of this arm is an upstanding member 144 which extends through an opening 145 in the frame member 14, this opening being to the front of the inset wall 101 and extending along the length of the path of traveling movement of the carriage 66. The member 144 carries a punch and die assembly 146 by means of which annotations are made on an index slip 147 carried by a holder 148 that overlies the opening 145 at a distance above the inset wall 101 (Figures 3 and 6). The holder is of a common form comprising a flat plate 149 having top and bottom edges folded back on itself to provide a channel through which the index slip 147 can be inserted.

The punch and die assembly 146 comprises a U-shaped extension 150 of the member 144, which extension embraces the index slip 147 and holder 148. The legs of this U-shaped extension lying below and above the holder 148 have side plates 153 and 154 secured thereto. Formed between this extension and the lower side plate 153 is a pair of rectangular apertures 155a and 156a and formed between the extension and the upper side plate 154 is another pair of aligned rectangular apertures 155 and 156. In the holder 148 there is a pair of clearance slots 157 and 158 between these aligned pairs of apertures. Mounted in the upper apertures are respective push-operable punches 159 and 160 which are urged upwardly by suitable springs (not shown). As the punches are pressed downwardly they pass through the clearance slots 157 and 158 and enter the respective apertures 155a and 156a to punch small rectangular openings in the index slip. Since these punches are carried by the carriage 66 and moved along the index slip in accordance with the traveling movement of the recorder and reproducer translating devices relative to the record, one punch may serve to indicate lengths of separate items of dictation and the other to indicate places whereat errors and/or corrections are made.

The advance marking mechanism hereinbefore mentioned is carried with the punch assembly 146 just described, and comprises a U-bracket 162 having a supporting arm 161 fastened at 161a to the lower leg of the U-member 150 and the punch assembly (see Figure 3). This bracket 162 is positioned within the opening 145 below the slip holder 148 and is apertured to form two spaced bearings for slidably supporting an impaling pin 163. The upper end of this pin is pointed so that when the pin is driven upwardly it will pierce a small hole 178 in the index slip 147, there being a clearance slot 164 for the impaling pin in the slip holder 148 along the length of the latter. This impaling pin is controlled by the hand lever 100 so that the holes 178 are pierced in the index slip 147 at points whereat the machine is taken out of recording condition. When the operator backspaces the carriage to listen to a portion of dictation already recorded, the hole 178 farthest along the index slip serves as an indication of the position of farthest advance to which the recording operation has proceeded, this being in accordance broadly with the teachings of the Somers Patent No. 2,251,173 issued July 29, 1941. The way in which the pin 163 is operated to punch the holes 178 is herein next described.

Normally, the pin 163 is held by a spring 165 that is located between the upper leg of the U-member 162 and a collar 163a on the pin, in an unoperated position defined by the abutment of the collar against the bottom leg of the U-member. Pivoted at 167 to the left side of the arm 141 is a rock lever 168 having a forwardly-extending arm 168a bent over at right angles thereto and terminating below the impaling pin, the rock lever being held in a neutral position by a tension spring 169 connected between it and a pin on the arm 141. On the forward end portion of the arm 168a there is a hardened piece 170 for impingement against the bottom end of the impaling pin as the lever 168 is rocked counterclockwise, as it appears in Figure 3. The pin is so actuated to punch the index slip whenever the hand lever 100 is moved from recording position to neutral position by a mechanism consisting of an arm 172 secured to the hub 99 of the hand lever and a roller 173 on the rearward end of the rock lever 168. When the hand lever is moved to recording position an inclined cam 172a on the end of the arm 172 engages the roller 173 and cams the rock lever 168 in a reverse—i. e., clockwise—direction until the roller rides off the upper edge of the cam through a slot 174 (Figure 2), the cam 172a then having the position relative to the roller shown by dash-dot lines in Figure 3. When the hand lever 100 is next returned to neutral position, the under side of the cam 172a engages the roller 173 and cams the rock lever in a forward direction to move the impaling pin upwardly to punch a hole 178 in the index slip, the roller 173 then moving off the under side of the cam and returning to the relation thereto shown by their full-line positions in Figure 2.

A feature of our invention lies in the provision of a novel die and indicating member 175 in association with the advance-marking means described in the foregoing paragraph. This member 175 is riveted to the upper leg of the U-member 150 of the punch assembly (Figure 3) and extends forwardly therefrom across the index slip. The forward end portion 176 of this member 175 is bent back on itself in spaced parallel relation thereto and across the back side of the member in respect of its direction of advance across the index slip. The end of this curved end portion serves as an indicating pointer 177. The central opening of this curved end portion 176 is aligned with the impaling pin 163 so that the end portion 176 serves to back the border of the slip around the pin as the slip is punched. After the machine is taken out of recording condition, and the carriage 66 is moved manually for any purpose and is then to be restored to a suitable position to resume recording, the operator is to set the carriage to that position whereat the pointer 177 is aligned with the hole 178 which was produced when the machine was last taken out of recording condition. Since the pointer 177 is at a short distance back from the impaling pin in the direction of advance of the carriage, the aligning of the pointer 177 with the hole 178 farthest along the index slip will cause the recorder stylus to be positioned a slight distance ahead of the last recorded groove convolution to prevent possible overlapping of the final and initial portions of successive recordations on the record.

Instead of punching or impaling the slip to make position-indicating or other annotating marks thereon, we may alternatively make suitable impressions in a slip within the scope of our invention, and it is intended in the claims that the term "punch" shall include, as equivalents, means for so making impression marks on the slip. In the claims the recorder 43 and reproducer 44 are referred to generally by the term "translating means."

The embodiment of our invention herein particularly shown and described is illustrative and not necessarily limitative of our invention since the same is subject to changes and modifications without departure from the scope of our invention, which we endeavor to express according to the following claims.

We claim:

1. In a dictating machine including a translating device mounted for travelling movement relative to a cooperating record, and an index slip adapted to receive punch marks to indicate positions of said translating device relative to the record: the combination of means operatively connected to said device for selectively conditioning the same in recording and other conditions; a holder for supporting said index slip with one side thereof exposed; a punch moved along the back side of said index slip in corresponding relation to the movement of said translating device relative to the record; means operable by said conditioning means for actuating said punch to make a punch mark on said slip simultaneously as the condition of said device is changed; and a strip-like member carried with said punch and extending crosswise of said slip at the front side thereof, said member having a hook-shaped end portion in proximity with said slip and surrounding partially the point of contact of the punch with the slip for backing the border of the slip around the punch as the punch is operated, said hook-shaped end portion terminating in a pointer offset rearwardly with respect to the direction of travelling advance of said punch along the slip which when aligned with a punch mark on said slip will cause said translating device to be advanced by the amount of said offset from the position occupied by the translating device when said punch mark was made.

2. In a dictating machine including a translating device mounted for travelling movement relative to a cooperating record, and an index slip adapted to receive punch marks to indicate positions of said translating device relative to the record: the combination of means operatively connected to said device for selectively conditioning the same in recording and other conditions; a holder for supporting said index slip with one side thereof exposed; a punch moved along the back side of said index slip in corresponding relation to the movement of said translating device relative to the record; means operable by said conditioning means for actuating said punch to make a punch mark on said slip simultaneously as the condition of said device is changed; and a thin strip carried with said punch and extending crosswise of said slip at the front side thereof with its width dimension at right angles to the slip, said strip having a U-shaped end portion symmetrically disposed with respect to the axis of said punch when the punch is in effective position, said U-shaped portion being in proximity with said slip to back the border area of the slip around the punch as the punch is operated, and the end of said U-shaped portion trailing said punch with respect to its direction of travelling advance along the slip being pointed to constitute a pointer which when aligned with a punch mark on said slip will cause said translating device to be positioned ahead of the position it had when said punch mark was made.

3. In a dictating machine including a translating device mounted for travelling movement relative to a cooperating record, and an index slip adapted to receive punch marks to indicate positions of said translating device relative to the record: the combination of means operatively connected to said device for selectively conditioning the same in recording and other conditions; a holder for supporting said index slip with one side thereof exposed; a punch moved along the back side of said index slip in corresponding relation to the movement of said translating device relative to the record; means operable by said conditioning means for actuating said punch to make a punch mark on said slip simultaneously as the condition of said device is changed; and a thin strip carried with said punch and extending crosswise of said slip at the front side thereof with its width dimension at right angles to the slip, said strip having an integral end portion bent back on itself and in proximity with said slip to back a border area of the slip about said punch while a punch mark is being made, said end portion terminating in a pointer which is offset rearwardly from said punch with respect to the direction of travelling advance of the punch along the slip and which when aligned with a punch mark on said slip will cause said translating device to be advanced by the amount of said offset from the position occupied by the translating device when said punch mark was made.

CHARLES W. DANN.
RICHARD M. SOMERS.

REFERENCES CITED

The following references are of record in the file of this patent:

UNITED STATES PATENTS

| Number | Name | Date |
|---|---|---|
| 2,251,173 | Somers | July 29, 1941 |